US010733477B2

(12) United States Patent
Tate et al.

(10) Patent No.: US 10,733,477 B2
(45) Date of Patent: Aug. 4, 2020

(54) IMAGE RECOGNITION APPARATUS, IMAGE RECOGNITION METHOD, AND PROGRAM

(71) Applicant: CANON KABUSHIKI KAISHA, Tokyo (JP)

(72) Inventors: Shunta Tate, Tokyo (JP); Masakazu Matsugu, Yokohama (JP); Yasuhiro Komori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 15/819,489

(22) Filed: Nov. 21, 2017

(65) Prior Publication Data
US 2018/0150725 A1    May 31, 2018

(30) Foreign Application Priority Data

Nov. 28, 2016  (JP) .................................. 2016-229697

(51) Int. Cl.
| G06K 9/62 | (2006.01) |
| G06K 9/20 | (2006.01) |
| G06K 9/46 | (2006.01) |
| G06K 9/78 | (2006.01) |
| G06N 3/08 | (2006.01) |
| G06N 3/04 | (2006.01) |
| G06K 9/00 | (2006.01) |

(Continued)

(52) U.S. Cl.
CPC ....... *G06K 9/6256* (2013.01); *G06K 9/00624* (2013.01); *G06K 9/209* (2013.01); *G06K 9/46* (2013.01); *G06K 9/6255* (2013.01); *G06K 9/6269* (2013.01); *G06K 9/78* (2013.01); *G06N 3/0454* (2013.01); *G06N 3/08* (2013.01); *H04N 5/2353* (2013.01); *H04N 5/23219* (2013.01); *H04N 5/23229* (2013.01); *H04N 5/232133* (2018.08); *G06K 2209/21* (2013.01)

(58) Field of Classification Search
CPC ............. G06K 9/6256; G06K 9/00624; G06K 9/6269; G06K 9/78; G06K 9/46; G06K 9/209; G06K 9/6255; G06K 2209/21; H04N 5/232133; H04N 5/2353; H04N 5/23229; H04N 5/23219; G06N 3/0454; G06N 3/08

See application file for complete search history.

(56) References Cited

U.S. PATENT DOCUMENTS 5,627,908 A * 5/1997 Lee ................... G01N 15/1475
                                                             382/128
9,007,481 B2   4/2015 Hasegawa
(Continued)

FOREIGN PATENT DOCUMENTS

JP        2012113460 A      6/2012

OTHER PUBLICATIONS

Radhakrishna Achanta; SLIC Superpixels Compared to State-of-the-art Superpixel Methods; Journal of Latex Class Files vol. 6 No. 1 Dec. 2011 pp. 1-8.

(Continued)

*Primary Examiner* — Carol Wang
(74) *Attorney, Agent, or Firm* — Canon U.S.A., Inc. IP Division

(57) ABSTRACT

In the present disclosure, an image parameter of an input image is changed, features is extracted from each of a plurality of generated images, a category of each region is determined based on the features in each image, and the results are integrated.

12 Claims, 16 Drawing Sheets

(51) Int. Cl.
  *H04N 5/235* (2006.01)
  *H04N 5/232* (2006.01)

(56) References Cited

U.S. PATENT DOCUMENTS

| | | | | |
|---|---|---|---|---|
| 9,195,236 B1* | 11/2015 | Fairfield | ................ | G01C 22/00 |
| 2004/0015464 A1 | 1/2004 | Ii | | |
| 2006/0239534 A1* | 10/2006 | Sumida | ................ | G02B 21/367 |
| | | | | 382/133 |
| 2008/0049975 A1* | 2/2008 | Stiegler | ................... | G06T 7/20 |
| | | | | 382/104 |
| 2008/0317378 A1* | 12/2008 | Steinberg | ................. | G06T 5/50 |
| | | | | 382/275 |
| 2012/0194697 A1* | 8/2012 | Hasegawa | .......... | G06K 9/00355 |
| | | | | 348/223.1 |
| 2013/0106845 A1* | 5/2013 | Ko | ....................... | H04N 13/128 |
| | | | | 345/419 |
| 2015/0302566 A1* | 10/2015 | Shibata | .................. | G06T 5/001 |
| | | | | 382/159 |
| 2016/0171299 A1* | 6/2016 | Lee | .................... | G06K 9/00604 |
| | | | | 382/128 |
| 2016/0267333 A1* | 9/2016 | Jung | ........................ | G06T 7/73 |

OTHER PUBLICATIONS

Bennett Wilburn; High Performance Imaging Using Large Camera Arrays ; Electrical Engineering Department and Computer Science Department—Stanford University.
Alex Krizhevsky; ImageNet Classification with Deep Convolutional Neural Networks pp. 1-9.
Koen E. A. Van De Sande; Segmentation as Selective Search of Object Recognition ;IEEE International Conference on Computer Vision, 2011.

* cited by examiner

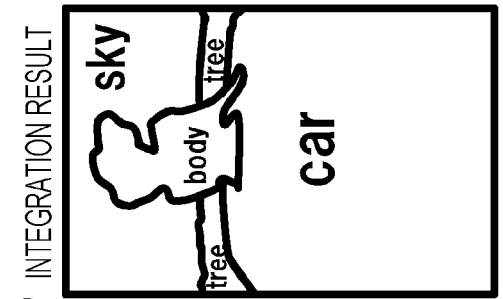
FIG. 3D INTEGRATION RESULT
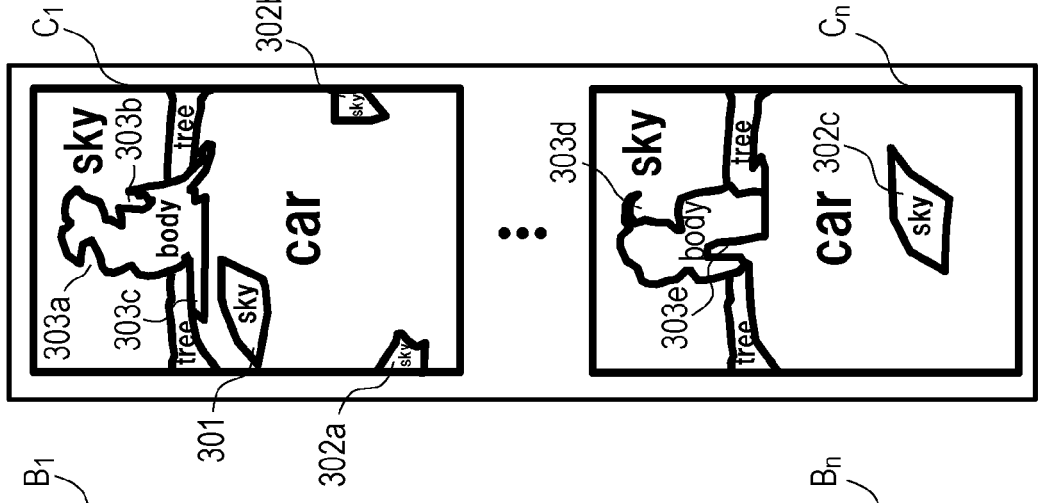
FIG. 3C RECOGNITION RESULT OF LOCAL REGION
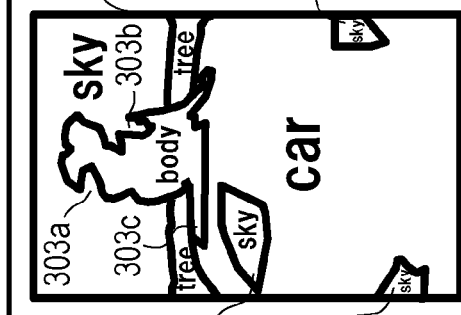
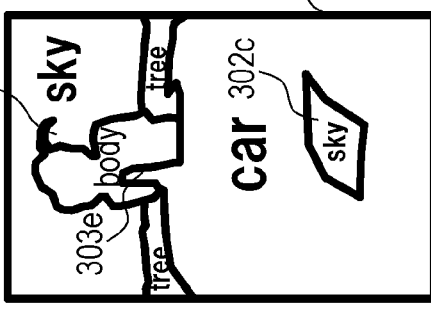
FIG. 3B LOCAL REGION EXTRACTION RESULT
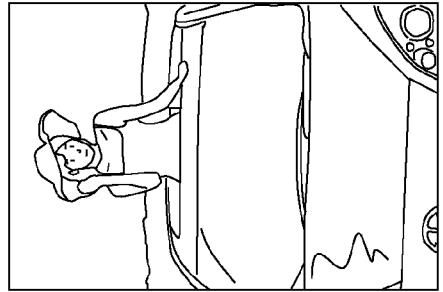
FIG. 3A INPUT IMAGE

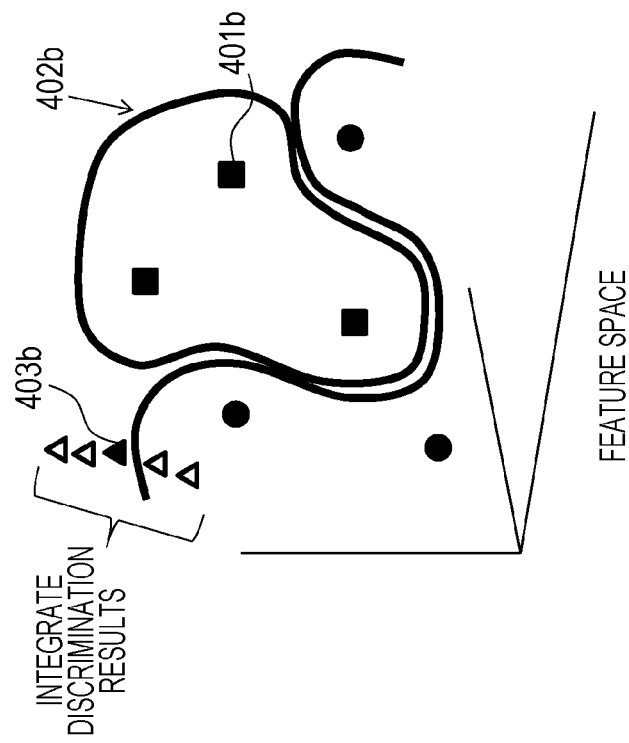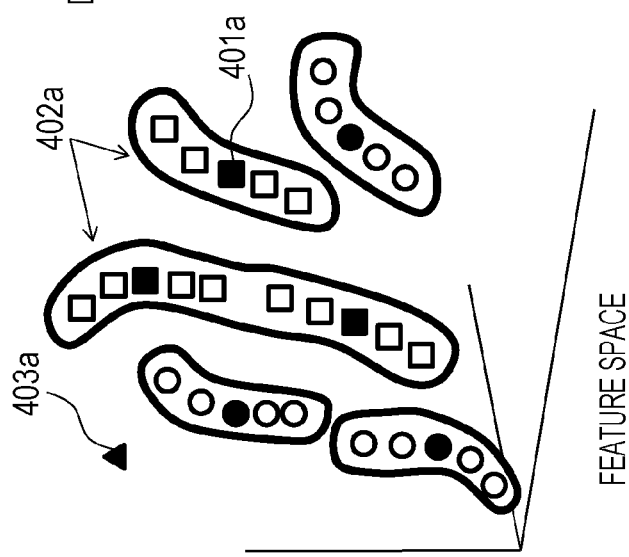

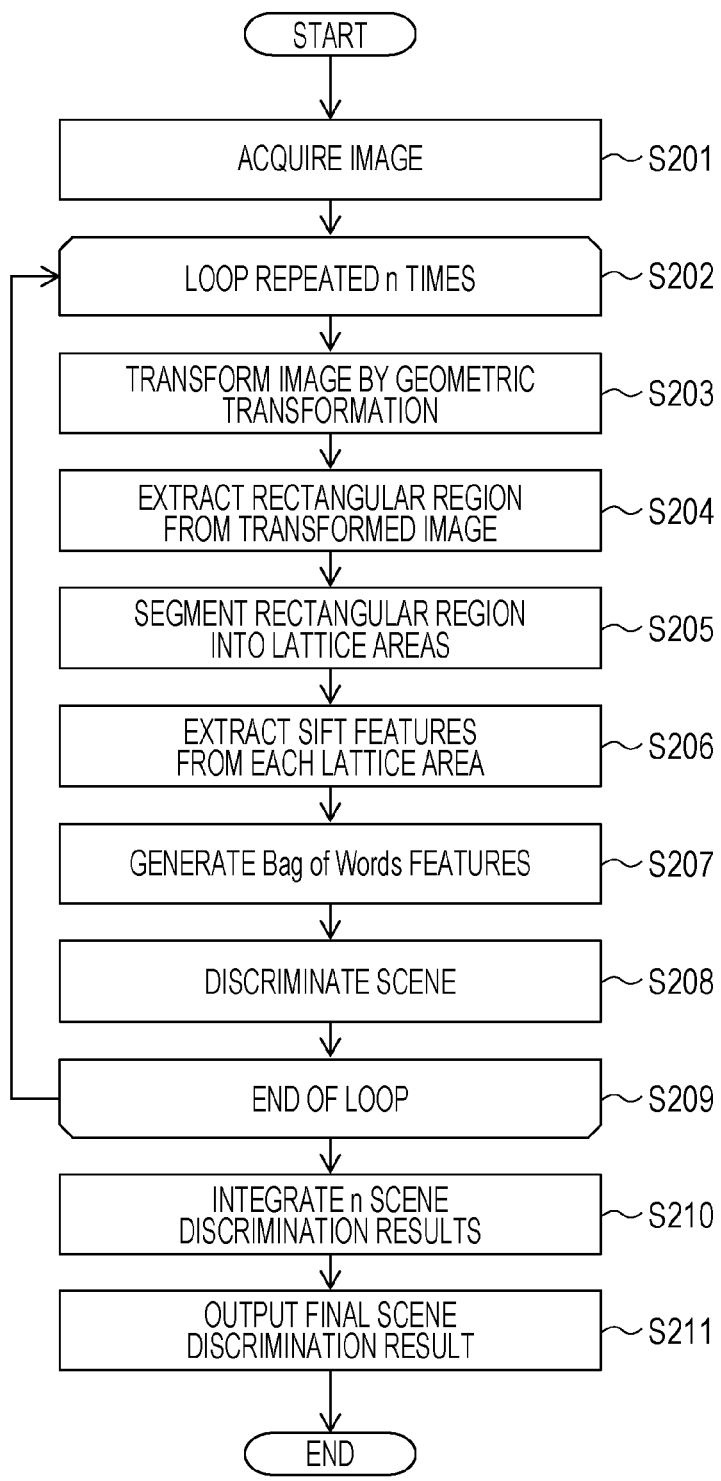

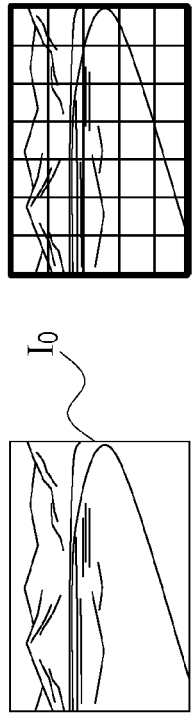
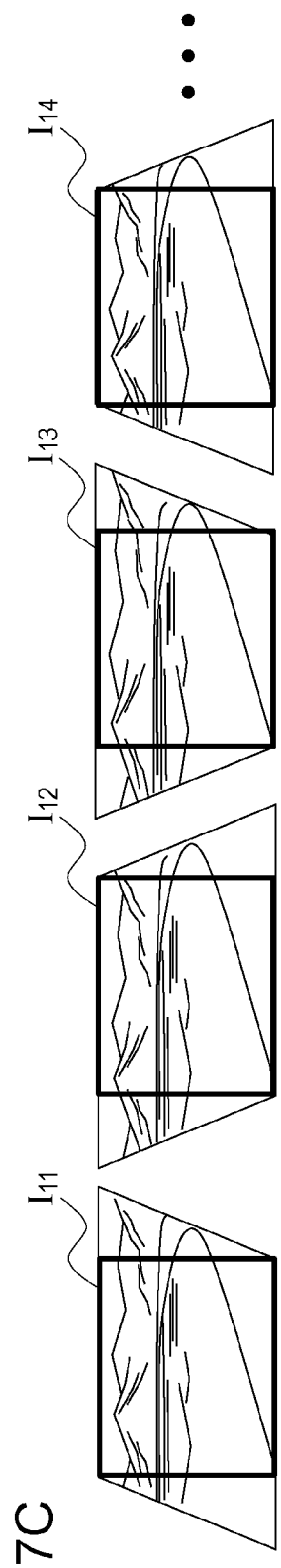
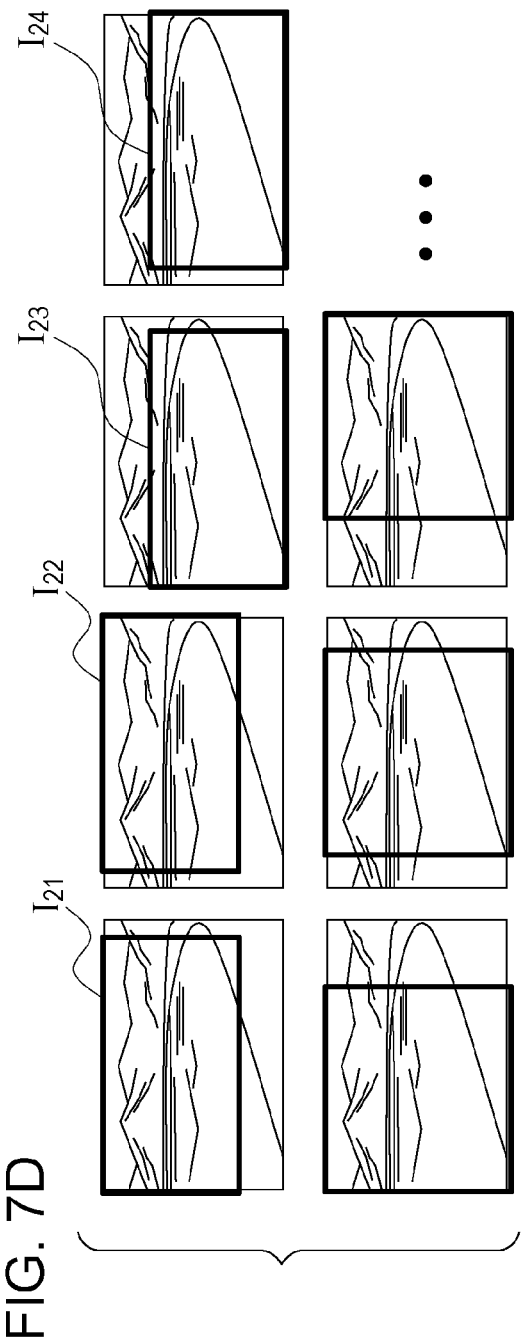
FIG. 7A
FIG. 7B
FIG. 7C
FIG. 7D

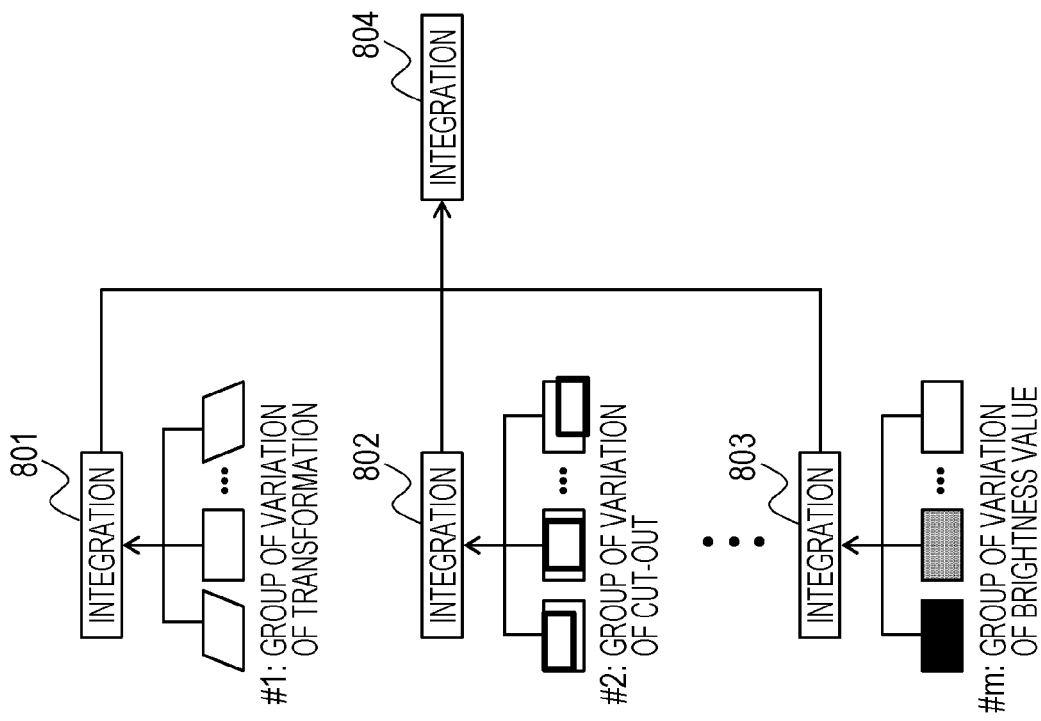
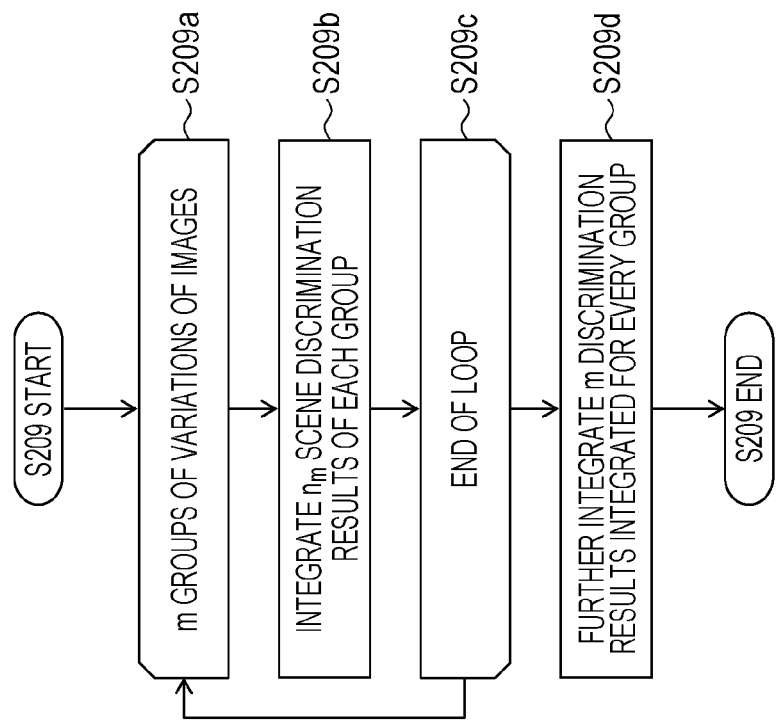

INTEGRATION RESULT

PERSON DETECTION RESULT

FOCAL POSITION CHANGED IMAGE

INPUT IMAGE

IMAGE RECOGNITION APPARATUS, IMAGE RECOGNITION METHOD, AND PROGRAM

BACKGROUND

Field of the Disclosure

The present disclosure relates to image recognition technology, such as detection of an object in an input image, region segmentation for segmenting an image to obtain a region for each object, and scene discrimination for discriminating a scene of an image.

Description of the Related Art

When learning and recognizing an object in an image, it is ideal that the object is captured under many image capturing conditions with a plurality of image capturing apparatuses, and that the captured images are set to be learning examples. If learning is performed based on a small number of learning examples, not the feature of the object itself, but even factors irreverent to the object, such as image capturing conditions during image capturing, e.g., brightness and darkness related to an exposure value, characteristics of each image capturing apparatus, such as blurring of a lens, etc., may be learned incorrectly as a part of a feature.

To address this issue, U.S. Patent Application Publication No. 2004/0015464 discloses increasing variations of learning examples by processing an image. Processing an image here includes addition of noise, a change in a brightness value, and an operation of affine deformation.

However, in the method disclosed in U.S. Patent Application Publication No. 2004/0015464, the variation by processing the image will partially differ from actual distribution of variation in the image. For example, suppose there is an image of a red car as a learning example, and the number of learning examples is increased by a change in a brightness value and transformation of the image. However, since the color of the car body has not been changed, a ratio of the "red car" in the learning examples of cars increases significantly. As a result, recognition becomes robust to variation whereas over-learning that an object in a red region is recognized as a car will be easily caused.

Accordingly, there is a need to provide image recognition which is robust to variation.

SUMMARY

An aspect of an embodiment includes an acquisition unit configured to acquire an image, a change unit configured to change a parameter of the acquired image, an extraction unit configured to extract features from each of images having different parameters, a recognition unit configured to recognize the images having different parameters based on the extracted features, and an integration unit configured to integrate recognition results by the recognition unit by using a classifier having learned in advance to use the result of the recognition unit as input and to output a teaching value as a target value.

Further features of the present disclosure will become apparent from the following description of exemplary embodiments with reference to the attached drawings.

BRIEF DESCRIPTION OF THE DRAWINGS

FIGS. 3A to 3D illustrate a result of the image recognition process according to one or more aspects of the present disclosure.

FIGS. 4A and 4B illustrate an effect of the image recognition process according to one or more aspects of the present disclosure.

FIG. 6 is a flowchart of an image recognition process according to one or more aspects of the present disclosure.

FIGS. 7A to 7D illustrate an example of geometric transformation performed by an image parameter change unit in the second embodiment according to one or more aspects of the present disclosure.

FIGS. 8A and 8B illustrate an alternative embodiment of a result integration unit according to one or more aspects of the present disclosure.

DESCRIPTION OF THE EMBODIMENTS

First Embodiment

Hereinafter, a first embodiment of the present disclosure will be described in detail with reference to the drawings. In the present embodiment, an example of semantic region segmentation in which an image recognition task discriminates categories of objects of an input image, and segments the image into regions will be described. The categories of the objects may include general C categories, such as the sky, a person, plants, a building, a car, and a road.

Figure 1:
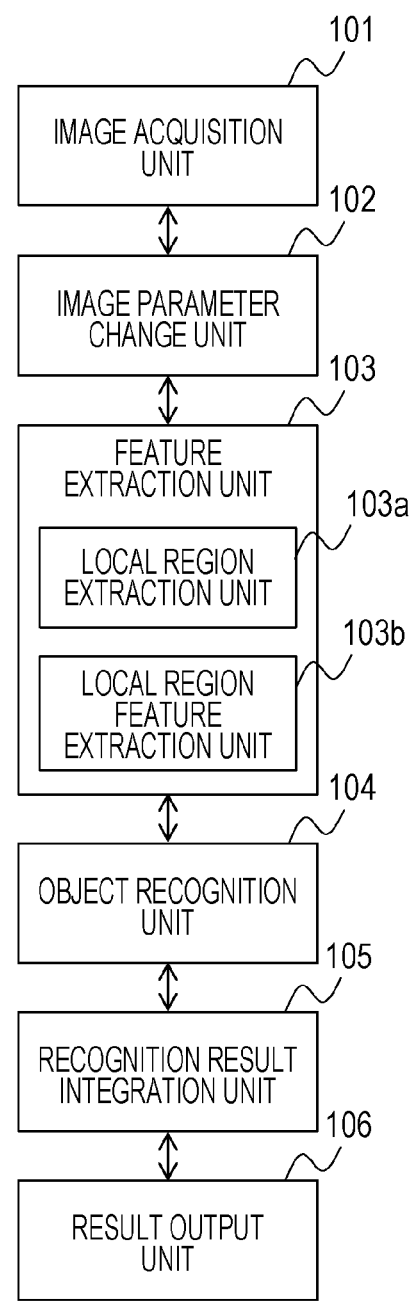
FIG. 1 is a schematic block diagram of an image recognition apparatus according to one or more aspects of the present disclosure.

FIG. 1 is a block diagram illustrating a functional configuration of an image recognition apparatus according to the present embodiment. The image recognition apparatus includes an image acquisition unit 101 which acquires an image to be subjected to image recognition, an image parameter change unit 102 which changes a parameter of the acquired image, and a feature extraction unit 103 which extracts features from a plurality of images having different image parameters. The image recognition apparatus also includes an object recognition unit 104 which recognizes an object regarding each image based on the features, a recognition result integration unit 105 which integrates a plurality of recognition results and performs final discrimination, and a result output unit 106 which outputs a recognition result. The feature extraction unit 103 includes a local region extraction unit 103a which extracts local regions from the input image, and a local region feature extraction unit 103b which extracts features from the local regions.

The image recognition apparatus according to the present embodiment includes a hardware configuration of a CPU, ROM, RAM, a HDD, and so forth. When the CPU executes a program stored in the ROM, a HDD, etc., each of above functional configurations or a process of a later-described flowchart is implemented, for example. The RAM has a storage area which functions as a work area in which the CPU develops and executes a program. The ROM has a storage area in which a program and the like to be performed by the CPU is stored. The HDD has a storage area in which various kinds of data including data about various programs needed when the CPU executes the process is stored.

Figure 2:
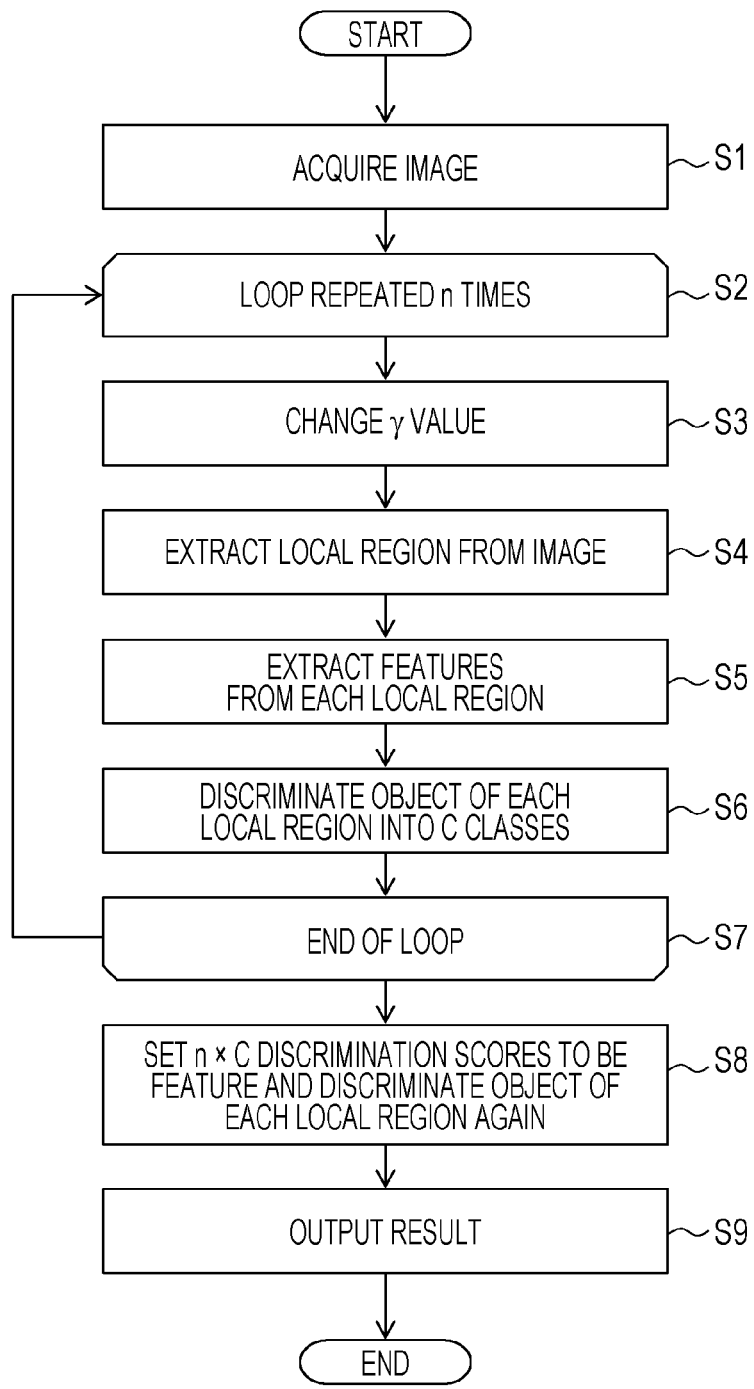
FIG. 2 is a flowchart of an image recognition process according to one or more aspects of the present disclosure.

Next, details of an image recognition process to be executed by the image recognition apparatus of the present embodiment will be described with reference to FIG. 2. First, in step S1, an image acquisition unit 101 acquires an image from an image capturing apparatus, such as a camera, for example. The image here is a still image, or one frame in a moving image.

Next, step S2 to step S7 are n repeating processes. Here, n images having different image parameters are created, and objects are discriminated about each image. In the present embodiment, the following steps will be described as a loop, however, these steps may be processed in parallel.

In step S3, the image parameter change unit 102 changes a parameter of the image. Specifically, an entire brightness value of the image is changed by a γ-value transformation represented by the following Expression 1.

$$Ii(R) = (I0(R))^{\gamma i}$$

$$Ii(G) = (I0(G))^{\gamma i}$$

$$Ii(B) = (I0(B))^{\gamma i} \qquad (1)$$

In Expression 1, Ii is the i-th image created by performing γ-value transformation (hereinafter, referred to as "variation image Ii"). I0 is a still image acquired by the image acquisition unit 101. I0(−) is a value of each RGB channel of the image. γi is a parameter of a γ value of the variation image Ii. Here, the value of each RGB channel of the image I0 is normalized in advance so that the minimum value and the maximum value in the image become 0 and 1, respectively.

If γ=1, a pixel value after transformation is the same value as a pixel value of an original image I0. If γ>1, the image is transformed to be darker on the whole, and if γ<1, the image is transformed to be brighter on the whole. The number of variations of the images is set to n=5, and the values of γ1 to γ5 are set to be Γ=[½, 1/√2, 1, √2, 2]. Regarding an image for which exposure is not appropriately set during image capturing, by performing transformation of the γ values of a plurality of patterns as described above, it is expectable that either of the images after transformation becomes closer to an image captured with proper exposure.

Next, in step S4, the feature extraction unit 103 extracts features for discriminating each region. Here, the local region extraction unit 103a first extracts local regions from the variation image Ii. Specifically, an image is segmented into groups of pixels of similar colors called superpixels using a method described in R. Achanta, A. Shaji, K. Smith, A. Lucchi, P. Fua, and S. Susstrunk, SLIC Superpixels Compared to State-of-the-art Superpixel Methods, IEEE Transactions on Pattern Analysis and Machine Intelligence, vol. 34, Num. 11, p. 2274-2282, 2012, for example.

FIGS. 3A to 3D illustrate a result of the image recognition process according to the present embodiment. FIG. 3A illustrates an input image, and FIG. 3B illustrates a result of a process of superpixel extraction. FIG. 3B illustrates a result of a process about two images (images $B_1$ and $B_n$) among n variation images. Here, a superpixel technology called SLIC disclosed in R. Achanta, A. Shaji, K. Smith, A. Lucchi, P. Fua, and S. Susstrunk, SLIC Superpixels Compared to State-of-the-art Superpixel Methods, IEEE Transactions on Pattern Analysis and Machine Intelligence, vol. 34, Num. 11, p. 2274-2282, 2012 is used. Some of the superpixels are denoted by $SP_{11}$ to $SP_{16}$.

In step S5, the local region feature extraction unit 103b extracts features from the superpixels obtained in the preceding stage. Here, general features, such as a histogram of color distribution and a local binary pattern (LBP), is extracted.

In step S6, the object recognition unit 104 performs category discrimination for each superpixel. The object recognition unit 104 is constituted by a classifier of a support vector machine (hereinafter, "SVM"). The SVM is provided with a teaching value of a category as a learning image in advance, and learning is performed in advance so as to use the features of the superpixel as an input variable and a correct answer category as a target variable, and to output a correct category (a target value) with respect to the provided input variable. Since the SVM basically is a 2-class discriminator, the SVM performs learning for each category with a target category serving as a positive example, and all other categories serving as negative examples, and prepares C SVMs. As a result of discrimination process in step S6, discrimination scores of C categories are acquired with respect to a single superpixel.

Here, the γ value is not transformed when the SVM is learning, and learning is performed only using the acquired original image. At the time of discrimination, the SVM of discrimination dictionary learned as described above is used with respect to every variation image Ii. Examples of discrimination results of the category of the image for each superpixel are denoted by $C_1$ and $C_n$ in FIG. 3C. In FIG. 3C, each region is provided with a name of the category in which the highest SVM score is acquired. When n times of the repeating processes to step S7 end, the loop will be completed.

Next, in step S8, the recognition result integration unit 105 integrates the category discrimination results from the variation images I1 to In and generates the final result. In this process, discrimination and integration are performed on a pixel basis. Likelihood of the final category of each pixel is calculated using the following Expression 2.

$$P(L(x,y)=c) = \sigma(\Sigma_i \Sigma_j \beta_{ij} \times S_{ij}(x,y) + \beta_c) \qquad (2)$$

In Expression 2, $S_{ij}$ (x, y) is a score of the discrimination result of the SVM discriminated in the preceding stage, and $S_{ij}$ (x, y) means likelihood of the category j of the pixel (x, y) of the variation image Ii. $\beta_{ij}$ and $\beta_c$ are learning coefficients. All the learning coefficients {β} are determined in advance by a general learning technique called logistic regression so that a difference of output results with respect to teaching values of training data becomes the minimum. σ(−) is a sigmoid function defined by the following Expression 3.

$$\sigma(x) = 1/(1 + \exp^{-x}) \qquad (3)$$

Thus, the final likelihood P as to whether each pixel (x, y) of the image has likelihood of the category c (L(x, y)=c) is obtained for each pixel (x, y) of the image by performing discrimination in a second stage in step S8.

Finally, in step S9, the CPU of the image recognition apparatus outputs the result of likelihood of the thus obtained category and completes the loop. FIG. 3D illustrates an output example provided with names of categories of the maximum likelihood of each pixel. The above is description of the procedure of the image recognition process of the present embodiment.

In the present embodiment, with the above-described structure, the following three effects can be exhibited in the process from the input to the output illustrated in FIGS. 3A to 3D described above.

1. Improvement in Accuracy in Classification by Change of Image Parameter

In the resultant image $C_1$ of FIG. 3C, a part of a region 301 of a car windshield is incorrectly recognized as the sky. This misdiscrimination occurs because the car windshield reflects the sky and shines in the drawings, the features of the windshield is similar to that of the sky. Discrimination of such an object is difficult in an image captured with a normal exposure value. However, when the image is changed to be darker by γ-value transformation, a difference between two textures of the glass and the sky may become obvious and discrimination may become easier. As the same phenomenon, when the entire image is transformed brighter, a dark object in shade and shadow becomes easier to view, and discrimination may become easier.

In the present embodiment, since the images are recognized after changing the image parameters, accuracy of the result may be improved when the results are integrated thereafter. In the present embodiment, the result in which misdiscrimination is corrected after integration is illustrated in FIG. 3D.

2. Reduction of Nonsystematical Misdiscrimination

If learning data is small in amount, there is a tendency of over-learning that even brightness or a subtle difference of tint of a learning example may be incorrectly learned as features of the object category. In that case, superpixels are discriminated correctly or incorrectly depending on a slight difference of the features. An example of the result is illustrated as regions 302a to 302c of FIG. 3C. In FIG. 3C, since the color of a car body is assumed to be red in the image, the red color tends to be partially misrecognized as the evening glow sky due to a variation of the slight brightness and the tint, which causes misdiscrimination.

The misdiscrimination is a nonsystematic error which may be caused irregularly with respect to the features or the position. Therefore, as in the present embodiment, if a plurality of variation images are recognized and the recognition results are integrated, misdiscrimination can be reduced with the effect of averaging and the result can be stabilized. As an example, the result in which misdiscrimination is corrected after integration is illustrated in FIG. 3D.

3. Change of Superpixel Accompanying Change in Image Parameter

Finally, misdiscrimination in which the region of the object is partially lost or is projecting may occur. A specific example of the misdiscrimination will be illustrated in FIG. 3C as denoted by 303a to 303e. The misdiscrimination occurs by a failure in extraction of superpixels by the local region extraction unit 103a in the preceding stage. For example, the superpixel denoted by $SP_{16}$ in FIG. 3B extracts a region laying across a part of a hat of a person and a background. Therefore, misdiscrimination occurs also on a boundary of a subsequent region discrimination 303a.

Generally, an extraction result of the superpixel is not always perfect, and a superpixel laying across different categories due to accidental similar color, for example, may be generated. In order to prevent such an error (undersegmentation), the size of the superpixel needs to be reduced. However, in an excessively small superpixel, features are not stabilized, and accuracy itself of region discrimination may be lowered (oversegmentation). It is a difficult problem equivalent to region segmentation to obtain an ideal superpixel with either undersegmentation or oversegmentation. Therefore, the result of the region discrimination technique based on the superpixels tends to include misdiscrimination such as "lack" and "burr shape" as illustrated in FIG. 3C.

To address the problem of this "lack" and "burr," in the related art method, a smoothing process, such as a conditional random field, is performed in a subsequent stage in many cases. In the present embodiment, occurrence of such a problem is reduced by integrating a plurality of results of region discrimination.

Here, it is important that the shape of the superpixels differ slightly for each variation of the image. In the example illustrated in the drawings, the extraction result of superpixels B1 and Bn in FIG. 3B differ from each other. In FIG. 3B, some superpixels are denoted by $SP_{11}$ to $SP_{16}$ and $SP_{n1}$ to $SP_{n6}$ for the ease of comparison. The superpixel technology like SLIC used in the present embodiment generates superpixels based on two standards. (1) Pixels of similar color are made to cluster as much as possible. (2) The shape of the region is made to as compact as possible. The superpixel is generated based on a delicate balance of these two standards. Therefore, if the brightness value of the entire image is changed, the shape of the superpixel will be changed and the positions of the "lack" and "burr" will also be changed.

If a plurality of superpixels having slightly different shapes are made to be recognized by the object recognition unit 104, there is a tendency that low discrimination scores are obtained about all of the C categories regarding the superpixels having a "lack" and a "burr" (e.g., the superpixel $SP_{16}$). Therefore, there is a tendency that a high discrimination score is obtained about a correct category regarding the superpixels in which a correct contour is acquired (e.g., the superpixel $SP_{n6}$). Therefore, in the final result in which these discrimination scores are integrated, priority is given to a correct result, and a result with higher accuracy on the border than that of each discrimination result is obtained as illustrated in FIG. 3D.

Comparison with Related Art

Here, a difference between the present embodiment and a method of the related art will be described with reference to FIGS. 4A and 4B. Both of these two methods address an issue of how to perform recognition without being affected by variation of a parameter of the image from a small number of learning examples. Although the purpose is the same, the structure and the effect are different as follows.

FIG. 4A illustrates a related art method for processing and increasing learning data as described in U.S. Patent Application Publication No. 2004/0015464, for example. The related art method aims at obtaining a discrimination dictionary which is not influenced by variation, such as a variation of brightness and darkness, by compositing a plurality of images while changing parameters of the images, and learning all of the images. FIG. 4A illustrates distribution, on a feature space, of data generated by processing while adding variation to the learning example. As illustrated in FIG. 4A, data after composition tends to be distributed on the periphery of the original data (e.g., denoted by 401*a*) as many low-dimensional aspects to some extent. If learning is performed based on the data after composition, a local and fine boundary like an identification border 402*a* will be generated. Since the identification border 402*a* has low generalization performance, reliability of the result when used for discriminating test data 403*a* is low. Further, the result is unstably varied easily due to a slight difference in the features.

In the present embodiment, learning is performed without compositing learning data, as illustrated in FIG. 4B. Therefore, the shape of an identification border 402*b* of FIG. 4B is gentler than the shape of the identification border 402*a* described above. At the time of recognition, test data 403*b* is processed and a plurality of image variations is generated, and each of the image variations is recognized. In example of FIG. 4B, two examples among a plurality of image variations are discriminated as positive examples. When these results are integrated, a recognition result that the example is a positive example is obtained finally. Since the result is determined by the decision by majority as a result of a plurality of variations of the images, the result is not varied unstably with respect to variation in the features.

As described above, in the present embodiment, features are extracted from each of a plurality of images generated while changing image parameters of the input image, the category of each region is determined based on the features in each image, and the results are integrated. With this configuration, image recognition which is robust to variation can be performed.

Alternate Embodiments

In the first embodiment, the SVM is used as the object recognition unit 104, however, other classifiers may be employed. For example, the logistic regression, the neural network, the random forest, etc., may be used.

The object recognition unit 104 uses the classifier of the same discrimination dictionary when discriminating images of different variations, however, the discrimination dictionary may be changed. For example, the parameters of the images may be matched at the time of recognition and learning. Specifically, the image is transformed with respect to m learning data with a parameter $\gamma_i$ of a $\gamma$ value of the i-th variation. The SVM learns with m images obtained after transformation, and the obtained result may be a discrimination dictionary of the SVM to be used for the discrimination of the i-th variation image.

Here, there is risk of over-learning if each of n images is processed from m original images, and n×m image sets in which n images and m original images exist in mixture are used as learning data, as in the related art technique illustrated in FIG. 4A. In the present embodiment, since each of n classifiers uses only the m images for learning, there is no risk of over-learning.

Logistic regression is used as the recognition result integration unit 105 in the present embodiment, however, the method of integration is not limited to the same. Various other types of classifiers, such as SVM and boosting, may be employed. Further, instead of using a classifier, an easier process of simply averaging the scores and outputting the maximum value may be employed.

In the present embodiment, the recognition result integration unit 105 performs learning and recognition in the second stage by using scores of C classes of each pixel as an input variable. However, the form of the recognition result integration unit 105 is not limited to the same. For example, the recognition result integration unit 105 may learn using not only a single pixel but also all the scores in a region of the size of N×N pixels in the periphery of a target pixel connected and used as an input variable. In addition to the score of the recognition result, image features may be used together. In this manner, if learning and recognition considering a greater number of variables are performed, even if a region discrimination result in the first stage has failed partially, a possibility that a correct result can be output in the second stage of presumption becomes higher with the tendency of the failure serving as a feature.

Figure 5:
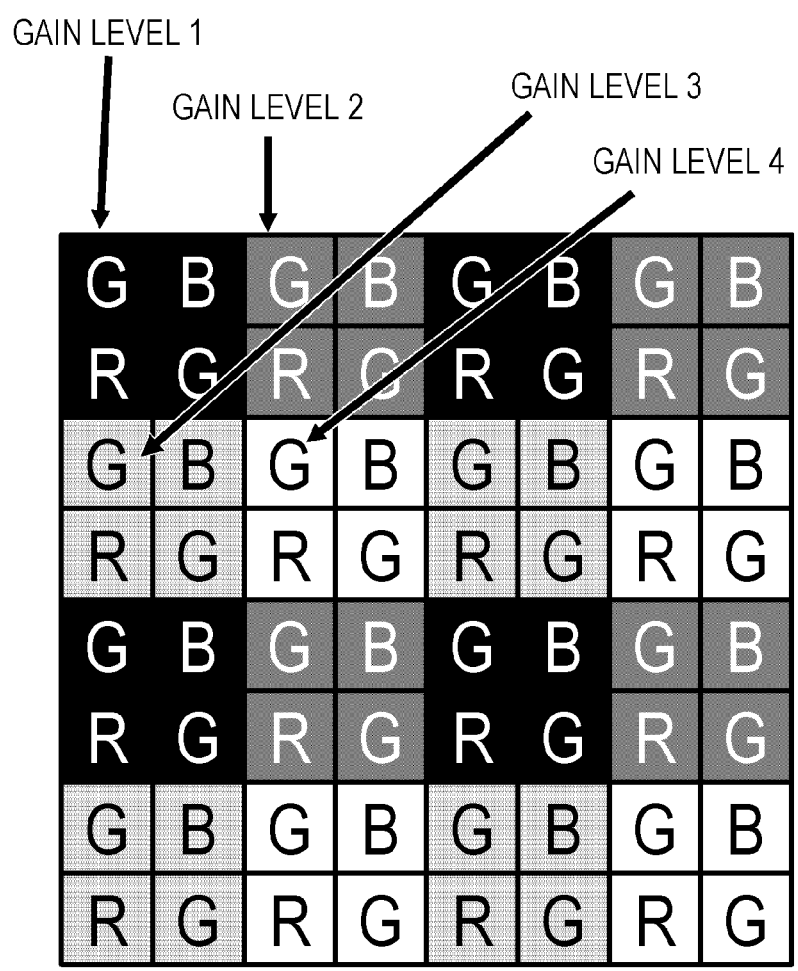
FIG. 5 illustrates a structure of an image capturing apparatus used in the first embodiment according to one or more aspects of the present disclosure.

In the present embodiment, the image by image parameter change unit 102 changes the parameter of the image after acquiring the image, however this processing may be performed at the time of image capturing. For example, if the target is an object with small motion, a plurality of images is captured while continuously changing the exposure values, and the captured images may be used as variations of the images. Further, a plurality of images of different exposure values may be acquired at a single image capturing event with a special image capturing device consisting of image capturing elements having different exposure gains as illustrated in FIG. 5, for example. FIG. 5 illustrates a part of a Bayer array of the image capturing elements which consist of a regular repetition of pixels having different exposure gains. Here, the pixels are indicated by gain levels 1 to 4 depending on the magnitude of the gain of the pixel.

Figure 13A:
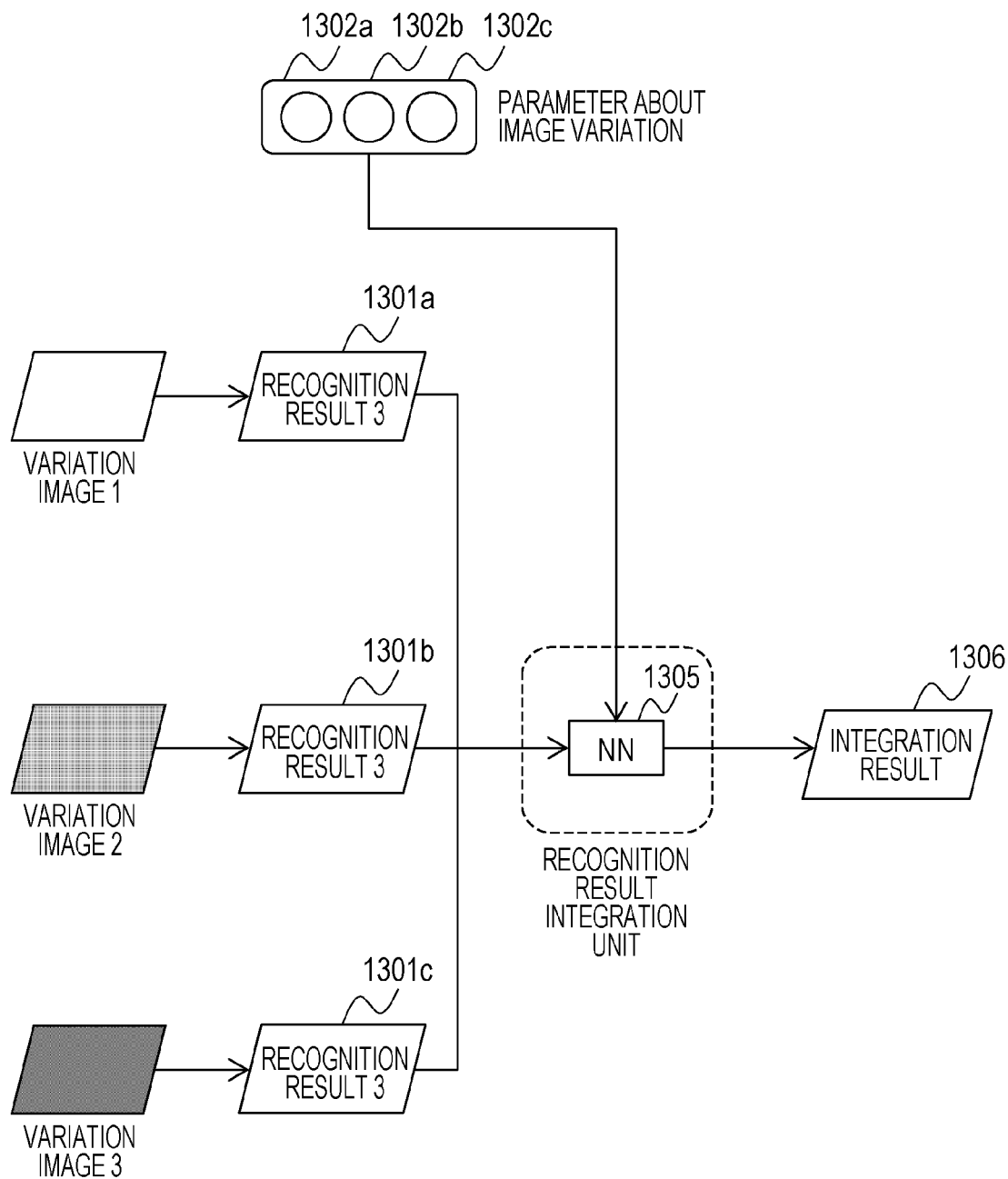
FIGS. 13A to 13C illustrate an outline of an image recognition process according to an alternative embodiment of the first embodiment.
Figure 13B:
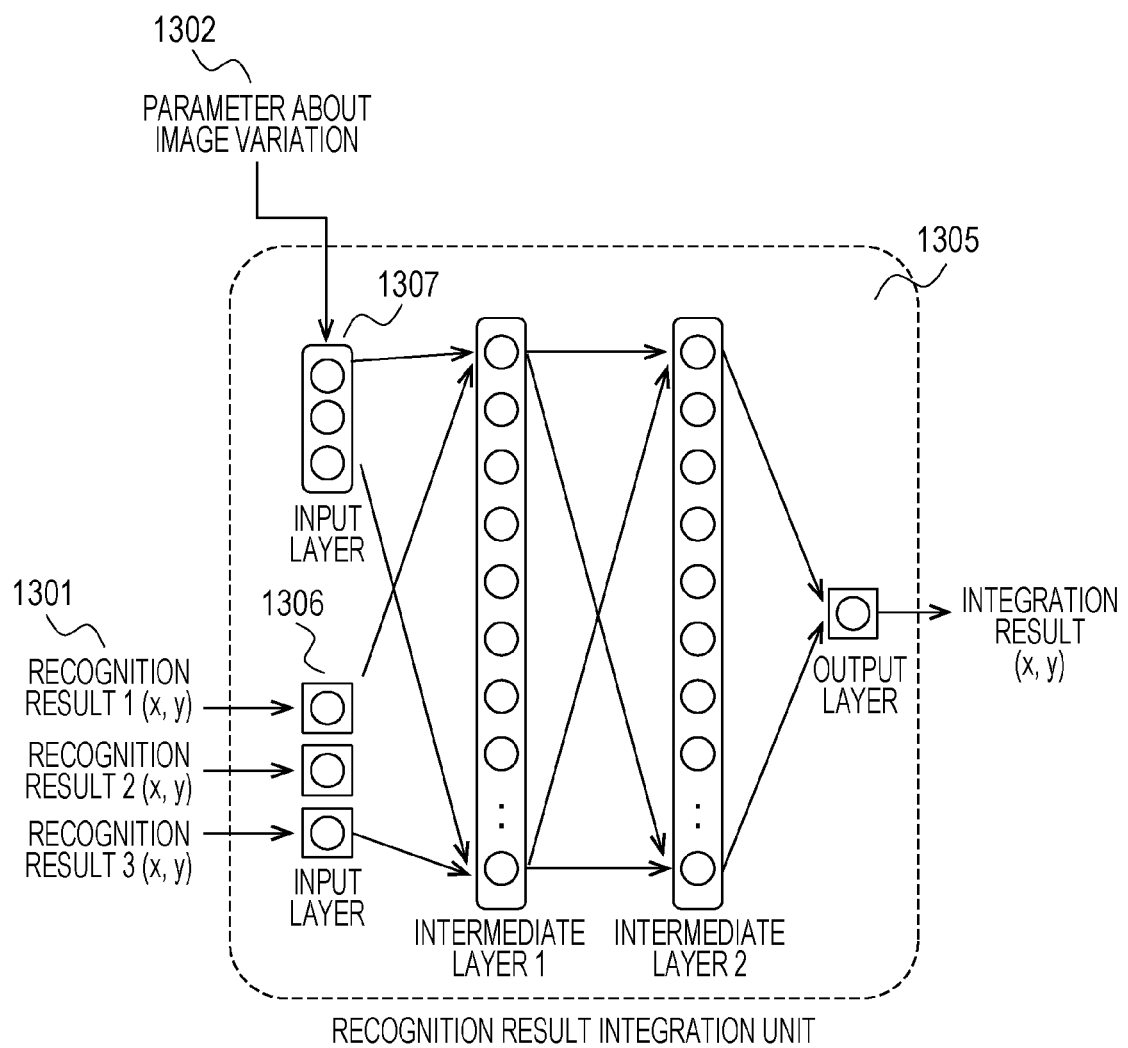
Figure 13C:
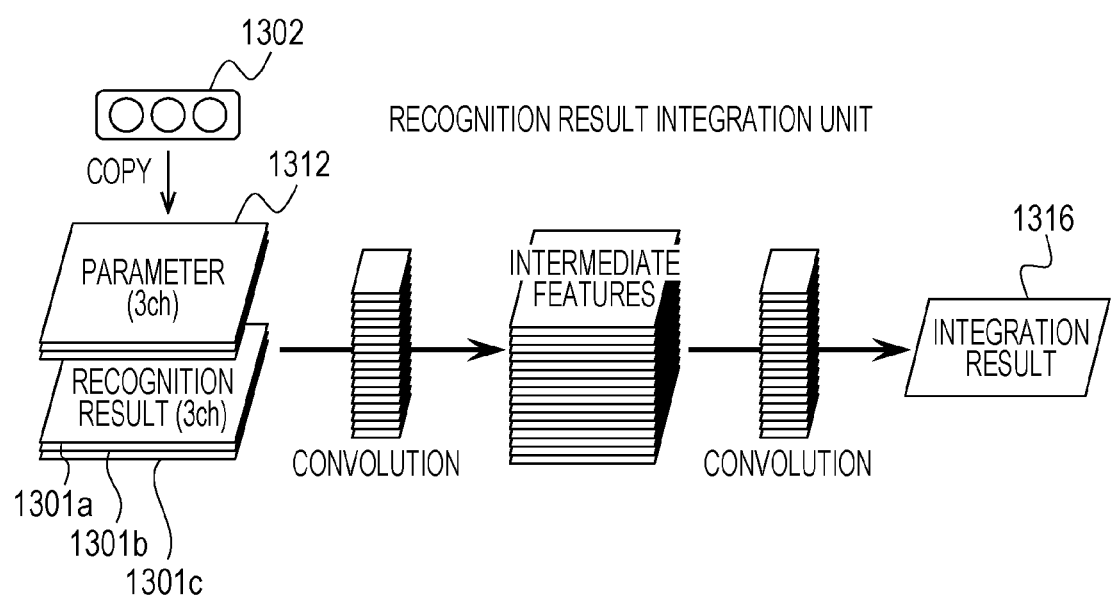

As an alternative embodiment of the present embodiment, a form in which parameters of the variation images are integrated as one of the clues of the recognition result integration unit 105 will be described. FIGS. 13A to 13C illustrate an effect of the image recognition process according to this alternative embodiment. FIG. 13A illustrates an outline of the image recognition process of this alternative embodiment. In this alternative embodiment, recognition results 1301*a* to 1301*c* of each of the variation images are input into the recognition result integration unit 105. Further, exposure values 1302*a* to 1302*c* are input as parameters about each variation image. The recognition result integration unit 105 is a multi-input and 1-output fully-connected neural network 1305. An example of an internal configuration is illustrated in FIG. 13B. Here, for the ease of description, recognition targets are limited to two classes of the positive example and the negative example.

Figure 14:
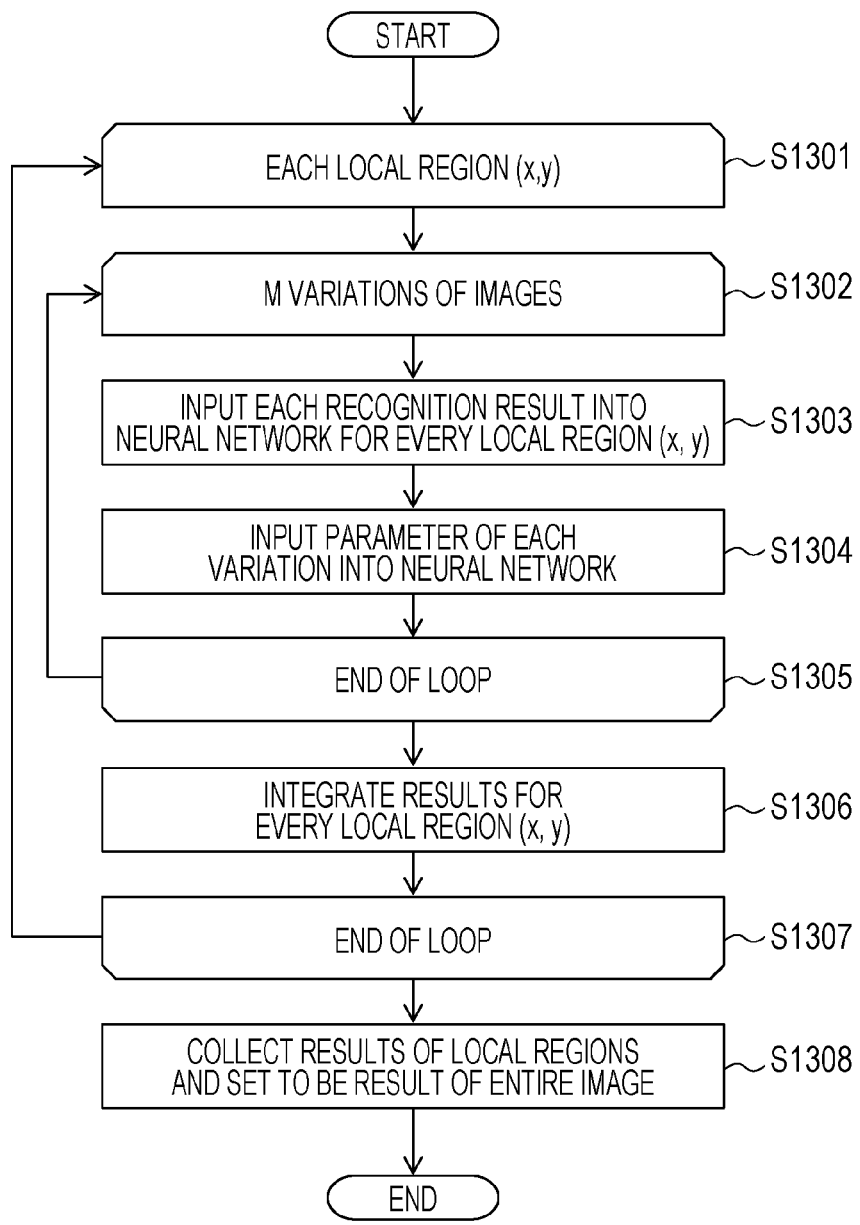
FIG. 14 is a flowchart of an image recognition process according to the alternative embodiment of the first embodiment.

FIG. 14 is a flowchart illustrating the process of the recognition result integration unit 105 in detail. When an operation of integration is started, recognition results 1301 of N variation images are input into a first input layer 1306 of the neural network (steps S1301 to S1303). Here, the recognition results 1301 are N likelihoods representing whether a superpixel (x, y) is a positive example. Then, N parameters 1302 which are exposure parameters of variation are input into a second input layer 1307 (step S1304).

The first input layer 1306 and the second input layer 1307 are combined with an intermediate layer which is a fully-connected layer. Numeric conversion of the input data is performed on each layer, and the result of the superpixel (x, y) is finally output to an output layer (S1306). Further, the results of each of the superpixels are integrated into a single image and produced as an integration result (S1307). A coupling weight of each layer of the network is learned by providing learning data through example learning in advance so that a correct result can be output. With the above configuration, information about the variation images provided to the recognition result integration unit 1305 is used for the integration. Therefore, even if the variations of the images change in various manners, the result can be integrated appropriately each time following the change.

It is also possible to add parameters about image capturing conditions, such as a focal length of a camera, to the information input into the recognition result integration unit 105. It is also possible to add a value of a category of scene classification of an image, etc. The categories of scene classification may be determined by preparing a scene recognition module and using the result of the scene recognition. By learning an example in a neural network after adding these additional parameters, it is also possible to integrate the results more accurately depending on the parameters.

If pixels, blocks, etc. are used as the local regions instead of the superpixels, a convolutional neural network (hereinafter, "CNN") may also be used as the recognition result integration unit 105. An example of this form is illustrated in FIG. 13C. In this example, first, a parameter of ternary variation is copied and a map 1312 of three channels of the same size as that of the image is generated. The map 1312 and the recognition result 1301 are together input into the CNN as an image of six channels. A convolution factor of the intermediate layer of the CNN is learned in advance so that a correct integration result 1316 may be obtained finally. A detailed operation of the CNN is a representative technique of a neural network and is disclosed in A. Krizhevsky et al., Image Net Classification with Deep Convolutional Neural Networks, NIPS 2012, for example, and description thereof is omitted.

As another form, the image recognition apparatus of the present embodiment is applicable to extraction of a main object region. In that case, first, data of a teaching value representing a region of a main object in the image is prepared separately as learning data used by the object recognition unit 104 for learning. Next, the features to be extracted by the local region feature extraction unit 103b is changed as follows. An example is similarity between features of a superpixel and features of superpixels in contact with the periphery of the superpixel. The similarity is a value called saliency, which is a similarity distance when features, such as a histogram of color distribution and LBP features, are compared between two superpixels, for example. For the comparison of the features, a value of KL divergence, histogram intersection, etc. between features, for example, is used. With the configuration described above, an image recognition apparatus which extracts a main object region can be easily constituted.

Second Embodiment

Next, a second embodiment of the present disclosure will be described. The present embodiment differs from the first embodiment in an image recognition task, change in image parameters, and a method of integration, etc. Especially the image recognition apparatus according to the present embodiment aims at discriminating the type (category) of a scene of an input image with a single still image serving as input. The category here is categories of C predetermined scenes classified in advance by a user, including mountain scenery, a scene in town, and a person portrait. Configurations described in the first embodiment are denoted by the same reference numerals and description thereof will be omitted.

FIG. 6 is a flowchart of the image recognition process according to the present embodiment. First, in step S201, an image acquisition unit 101 acquires a recognition target image in the same manner as in the first embodiment. Next, in steps S202 to S208, scene discrimination is performed about each of n variation images to which predetermined image parameter change is performed. Here, some of the variations of the changes of the n image parameters are geometric transformation. FIGS. 7A and 7B illustrate input images, and FIG. 7C illustrates an example of geometric transformation performed by an image parameter change unit 102 in step S203.

The image parameter change unit 102 performs geometric transformation, such as affine deformation and perspective projection transformation, as illustrated in FIG. 7C and changes the image (step S203). The image parameter change unit 102 extracts rectangular regions $I_{11}$ to $I_{14}$ from the image after transformation, and sets the extracted regions to be new images after transformation (step S204). Here, the rectangular regions $I_{11}$ to $I_{14}$ are the largest rectangles inscribed in the image after transformation as illustrated in FIG. 7C. However, this is not restrictive and circumscribing rectangles may be used, for example. Another some of the n variations are clippings of partial regions in the image. Examples of clippings with varied positional misalignment, size, etc. are illustrated as rectangles 121 to 124 in FIG. 7D.

A plurality of these transformation and clipping parameters are prepared in which values thereof are changed into parametrics within the limit that the images after transformation do not become unnatural. By preparing images of various variations, it is possible to perform more stable scene recognition than by recognition using only a single image.

Next, a feature extraction unit 103 segments each variation image into a predetermined number of rectangular regions as illustrated in FIG. 7B (step S205), and extracts SIFT features from each rectangular region (step S206). Further, the feature extraction unit 103 generates a code book from the SIFT features, totals the frequency histograms, and obtains features called Bag Of Words features (step S207). Therefore, a single feature vector is obtained with respect to a single variation image. Since the SIFT features and the Bag Of Words features are publicly known image recognition techniques, details thereof are not described here.

An object recognition unit 104 discriminates a scene of each variation image using a classifier, such as the SVM, with the feature amount vector serving as an input variable. The SVM outputs a score representing that each image belongs to either of the C predetermined scene categories (step S208). Therefore, C discrimination scores are obtained with respect to a single image.

If the number of variations of the images is n, n×C SVM scores will be obtained as a result of scene discrimination. A recognition result integration unit 105 connects these scores and sets to be features. The recognition result integration unit 105 performs the final scene category discrimination using a classifier, such as logistic regression which has learned in advance to use the features as an input variable and output a correct answer category of the scene (step S210). The above is the procedure of the image recognition process of the present embodiment.

Here, as an alternative embodiment of the present embodiment, the type of the image parameter to be used is not limited to transformation or clipping of an image, but may be a combination of various other parameters. For example, in the same manner as in the first embodiment, there are various parameters for generating variations of the images, such as transformation of the brightness value, transformation of tint by color tone correction, addition of noise as used in U.S. Patent Application Publication No.

2004/0015464, addition of blur to the entire image or the periphery of the image, and so forth. Further, a plurality of processes may be performed at the same time. For example, geometric transformation of an image and addition of noise may be performed at the same time. The present embodiment is not limited to any of these forms.

As another alternative embodiment, the local regions to be extracted by the local region extraction unit 103a may be superpixels as used in the first embodiment instead of the rectangles of regular intervals described here.

As another alternative embodiment, when the recognition result integration unit 105 integrates the recognition results, the recognition result integration unit 105 may integrate the n scene discrimination results stepwise in two or more stages instead of integrating at once. An example of the procedure is illustrated in FIG. 8A. FIG. 8B is a schematic diagram illustrating an outline of the process. Here, integration is performed every m variation group (step S209a, step S209b), and integration is performed again by a classifier 804 using the result as the feature quantity (step S209d). In this manner, it is expectable to perform accurate learning and recognition, while avoiding over-learning due to increased variations of the image.

The configuration for integrating the recognition results in a plurality of stages is not limited to that illustrated in FIG. 8B, however, a multilayer neural network may be constituted using the recognition result of each variation image as input features. Further, cascade boosting learning which is common in face recognition technology may be performed using the recognition result of each variation image as a weak classifier. In this manner, the present embodiment is applicable to various configurations.

As described above, according to the present embodiment, also in an image recognition apparatus of which recognition task is scene discrimination, image recognition which is robust to variation can be performed.

Third Embodiment

Next, a third embodiment of the present disclosure will be described. An image recognition apparatus according to the present embodiment aims at performing person detection in an image with a single image serving as input. In the present embodiment, a change in an image parameter is a change in a focal position of the image. In an image with a shallow focus depth, an object located at a position out of a focal plane is blurred. Therefore, it is relatively easy to separate an object in-focus. Therefore, if recognition is performed using an image with a plurality of focal positions as described in the present embodiment, accuracy of person detection is improved as compared with a case in which only a single image in which all the objects are in-focus (a pan-focus image) is used. Hereinafter, the present embodiment will be described. Configurations already described in the first and the second embodiments are denoted by the same reference numerals and description thereof will be omitted.

Figure 9:
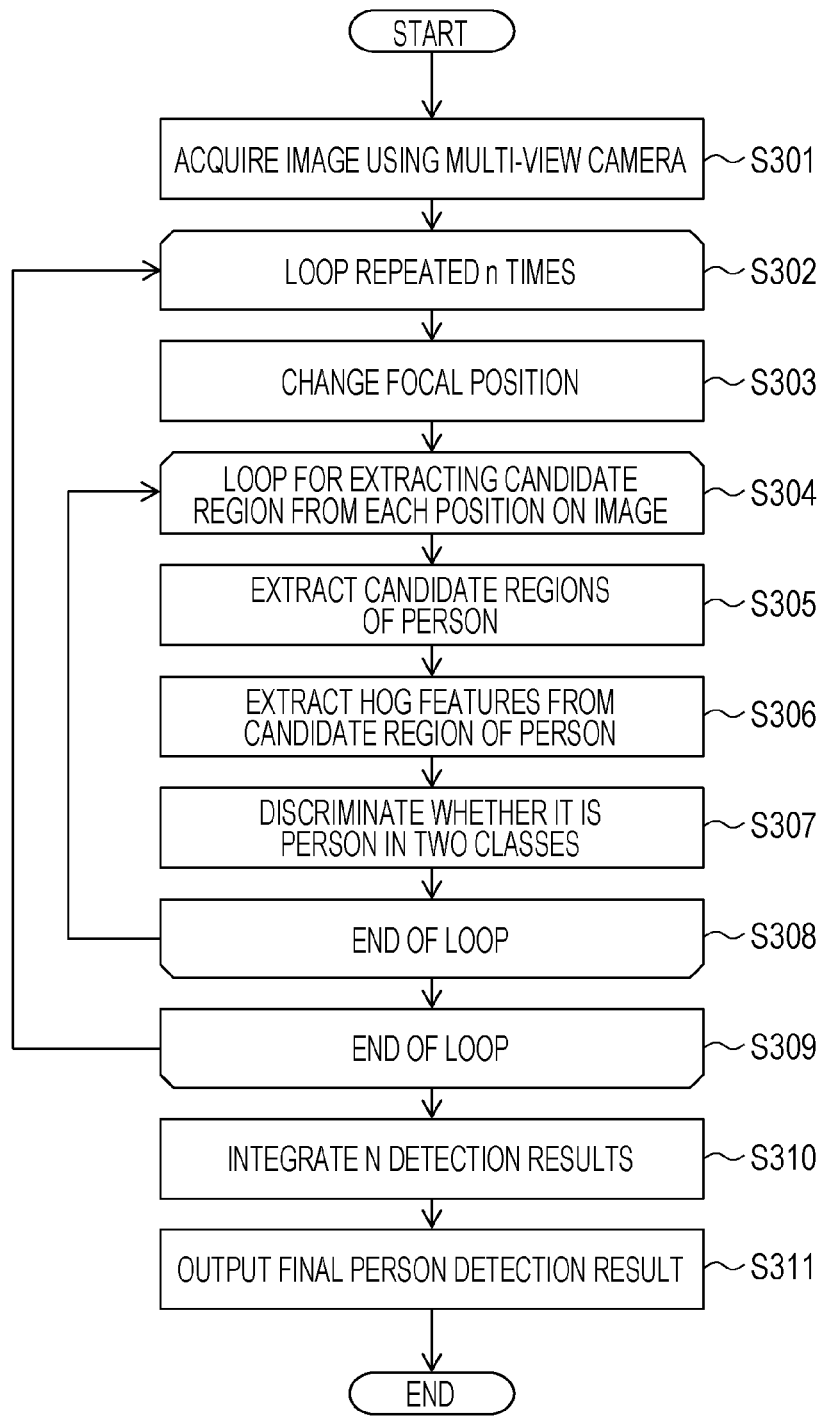
FIG. 9 is a flowchart of an image recognition process according to one or more aspects of the present disclosure.

FIG. 9 is a flowchart of an image recognition process according to the present embodiment. In step S301, the image acquisition unit 101 acquires an image. Here, the image is an image captured with a multi-view camera consisting of multi-view lens and a plurality of image capturing elements. According to the method described in B. Wilburn, M. Levoy, et. al., High performance imaging using large camera arrays, pp. 765-776, Proc of SIGGRAPH '05, 2005, it is possible to generate an image in which a focal position is placed on an arbitrary imaging surface from an image captured with a camera of such a structure.

Next, from step S302 to step S309 are steps in which variation images with focal positions varied into positions in n stages are generated, and person detection is performed for each image. The person detection is performed by a general person detection technique.

Figure 12A:
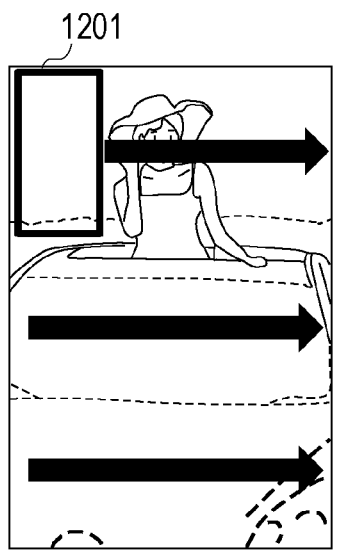
FIGS. 12A to 12C illustrate an outline of a process for extracting local regions in the third embodiment according to one or more aspects of the present disclosure.
Figure 12B:
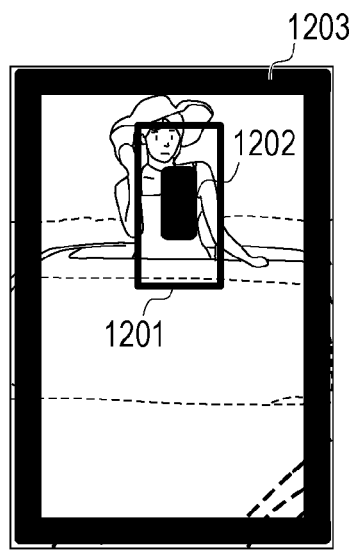
Figure 12C:
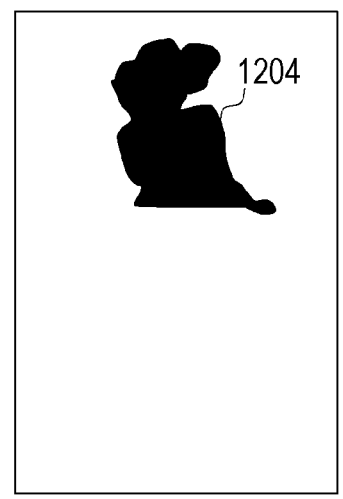

First in step S303, an image parameter change unit 102 generates a variation image Ii in which the focal position is set to a predetermined i-th position. Next, in step S304 and subsequent steps, a feature extraction unit 103 prepares a rectangular detection window, and scans a pattern on the variation image Ii using the detection window. FIGS. 12A to 12C illustrate an outline of a process for extracting local regions in the present embodiment. FIG. 12A illustrates an example of the rectangular detection window.

As a procedure, first, a local region extraction unit 103a extracts rectangular regions of a plurality of sizes in a plurality of positions on the image Ii, and normalizes the sizes of each region (step S305). Next, a local region feature extraction unit 103b extracts a histogram of oriented gradient features (HOG features) from each rectangular region (step S306). Then, an object recognition unit 104 inputs the HOG features into an SVM classifier, and obtains a discrimination score as to whether a pattern in the rectangular region is a person (step S307).

Figure 10D:
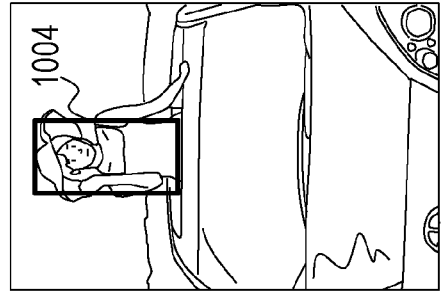
FIGS. 10A to 10D illustrate a result of a person detection process according to one or more aspects of the present disclosure.
Figure 10C:
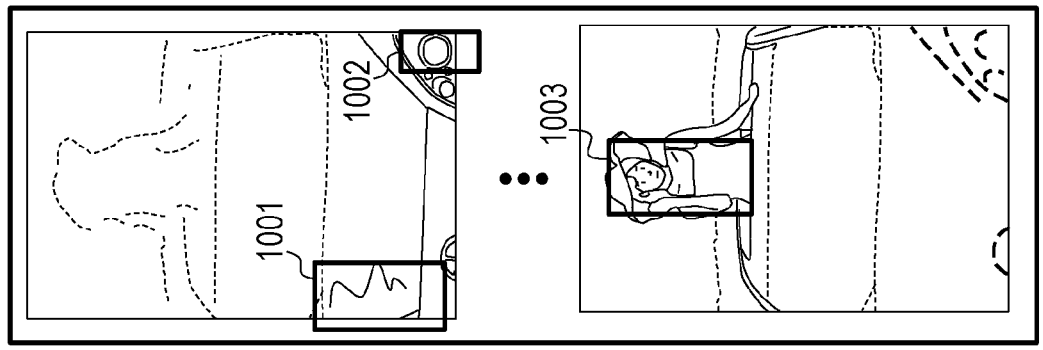
Figure 10B:
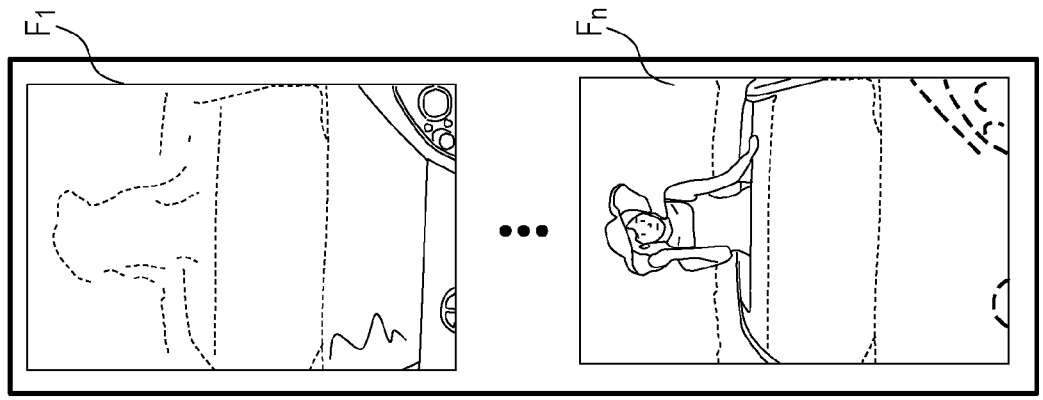
Figure 10A:
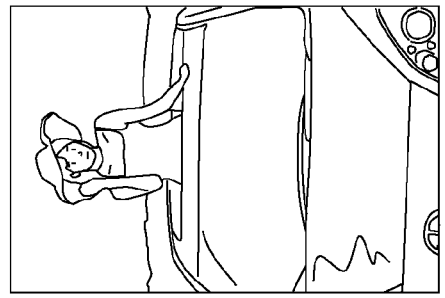

FIGS. 10A to 10D illustrate a result of the person detection. Images $F_1$ and $F_n$ of FIG. 10B illustrate two variation images among n variation images with different focal positions. Rectangles 1001 to 1003 in FIG. 10C represent positions and sizes of detection windows having especially high discrimination scores of a person among images $F_1$ and $F_n$.

Next, in step S310, a recognition result integration unit 105 performs final discrimination as to whether a person exists in each image position (x, y) using the discrimination score of the person obtained in the preceding stage as an input variable. The discrimination scores here are m×n scores consisting of the results of m detection windows of different size and n images of different focal positions about each image position (x, y). The recognition result integration unit 105 uses a vector in which all of these scores are connected as an input variable. The recognition result integration unit 105 consisting of the classifier, such as the SVM, learns and recognizes the input variable based on supervisory data, and outputs a determination score as to whether a person exists.

Next, in step S311, a result output unit 106 outputs a result that a person exists at a position (x, y) in which a value equal to or greater than a threshold is obtained among the above-described determination scores, and the process is completed. In order to improve accuracy of the detection result, a general post-processing called non-maximum suppression may further be performed. An example of the final result is illustrated as a rectangular window 1004 in FIG. 10D.

Alternative Embodiment of Detection Window

In the above description, a pattern is scanned in a general rectangular region by the person detection technique. As an alternative embodiment, a person may be detected in a region other than a rectangular region. For example, it is possible to change the shape of the local region in accordance with a change of a focal length or a position on the image. A specific example will be described below.

Figure 11:
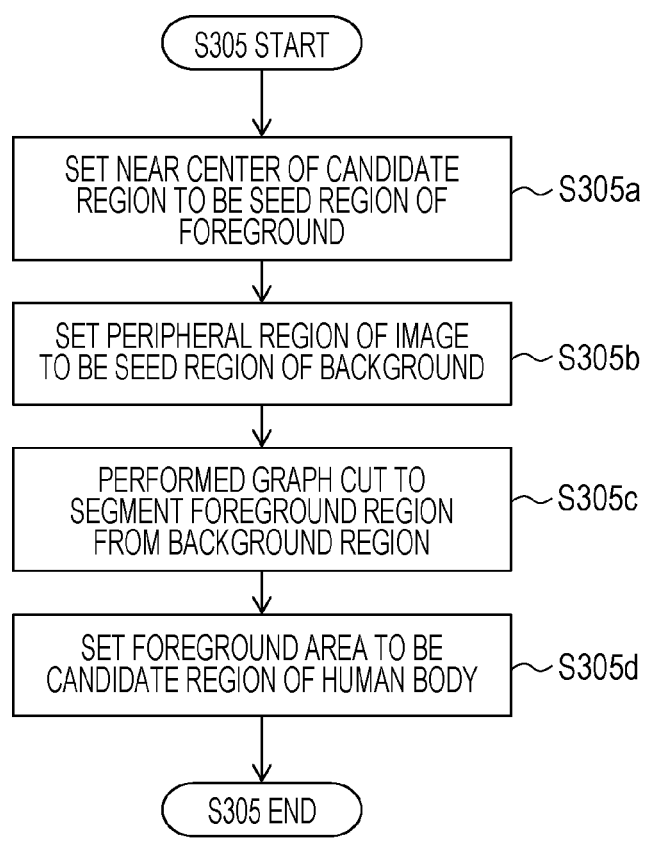
FIG. 11 is a flowchart of an alternative embodiment of a process for extracting local regions in the third embodiment according to one or more aspects of the present disclosure.

FIG. 11 is a flowchart corresponding to an alternative embodiment of a process for extracting a local region. FIG. 11 illustrates step S305 in the flowchart of FIG. 9 in detail. The processing result of the derived form of this process is illustrated in FIGS. 12B and 12C. A local region extraction unit 103a first extracts a center of a detection window 1201 of an image as a seed region 1202 of a foreground (step S305a). Similarly, the local region extraction unit 103a extracts a peripheral region of the image as a seed region 1203 of a background (step S305b). Further, the local region extraction unit 103a performs a general graph-cut process as a segmentation technique of the foreground and the background based on these seed regions (step S305c). Next, an obtained foreground area 1204 is set to be a candidate region of a person (step S305d). The above is detailed description of a derived form of step S305, and the process is performed each time the detection window is moved. When the local region feature extraction unit 103b extracts a HOG feature in step S306, the HOG features are extracted only from the foreground area 1204.

The thus extracted foreground area 1204 changes its shape in accordance with where the focal point of the image is located. Specifically, if the person is in-focus as in the example illustrated in FIG. 12B, a blurred background region will be excluded and only a region of the person is easily extracted as a foreground area. Therefore, in the subsequent object recognition unit 104, discrimination of a person becomes further easier.

With this configuration, by performing a change of the parameter during image capturing and subsequent extraction of the local region together, accuracy of person detection can be further improved.

Extraction of local regions is not limited to the configuration described above. For example, superpixels may be generated by the method described in Koen E. A. van de Sande, Jasper R. R. Uijlings, Theo Gevers and Arnold. W. M. Smeulders, Segmentation As Selective Search for Object Recognition, IEEE International Conference on Computer Vision, 2011, for example, the generated superpixels may be connected, and only a candidate region having a high possibility of being an object may be extracted. The present embodiment aims at detecting a person, however, it is also possible to change the teaching value of the learning data to change the detection target into a specific object, such as an animal and a car, other than a person.

As described above, according to the present embodiment, also in the image recognition apparatus of which recognition task is person detection, image recognition which is robust to variation can be performed. In the first and the second embodiments described above, the change of the image parameter performed by the image parameter change unit 102 is made by composition of the image. However, the present disclosure is applicable also to a form in which a plurality of images is made to have different parameters during image capturing as in the present embodiment.

Other Embodiments

In the present disclosure, a software (a program) which implements the functions of each of the embodiments described above is supplied to a system or an apparatus via a network or various storage media, and a computer (or a CPU, etc.) of the system or the apparatus loads and executes the program. The present disclosure may be applied to a system constituted by a plurality of devices or an apparatus configured by a single device. The present disclosure is not limited to the embodiments described above, and various modifications may be made without departing from the spirit of the present disclosure (including organic combinations of the embodiments), which modifications are not excluded from the scope of the present disclosure. All the configurations in which the embodiments described above and the alternative embodiments thereof are combined also included in the present disclosure.

According to the present disclosure, image recognition which is robust to variation can be performed.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-229697 filed Nov. 28, 2016, which is hereby incorporated by reference herein in its entirety.

What is claimed is:

1. An image recognition apparatus comprising:
   one or more processors; and
   a memory coupled to the one or more processors, the memory having stored thereon instructions which, when executed by the one or more processors, cause the apparatus to:
   acquire an image;
   generate a plurality of variation images by changing a parameter of the acquired image into each of different parameters;
   extract features from each of the plurality of variation images;
   perform regcognition on each of the plurality of variation images based on the extracted features; and
   integrate recognition results of the plurality of variation images into an integrated recognition result,
   wherein the recognition results of the plurality of variation images are integrated by using a classifier that has been trained to decrease a difference between an output of the classifier and a supervisory value of learning data.

2. The image recognition apparatus according to claim 1, wherein the recognition is performed to discriminate categories of regions included in the image.

3. The image recognition apparatus according to claim 1, wherein the recognition is performed to discriminate types of scenes of the image.

4. The image recognition apparatus according to claim 1, wherein the recognition is performed to detect a specific object included in the image.

5. The image recognition apparatus according to claim 1, wherein the recognition is performed to detect a main object included in the image.

6. The image recognition apparatus according to claim 1, wherein the classifier has learned in advance to further use any of the parameter about an image, camera information during image capturing, or a recognition result of an image as input and a supervisory value as a target value, and to output the integrated recognition result.

7. The image recognition apparatus according to claim 1, wherein recognition results of the plurality of images are integrated stepwise.

8. The image recognition apparatus according to claim 1, wherein the change of parameter includes at least one of a change of an exposure value of the image, a change of a brightness value of the image, transformation of the image, clipping of the image, addition of noise to the image, addition of blur to the image, and a change of a focal position of the image.

9. The image recognition apparatus according to claim 1, wherein the memory further stores instructions which, when executed by the one or more processors, cause the apparatus to acquire a plurality of images by changing the parameters of the images during image capturing.

10. The image recognition apparatus according to claim 1, wherein the memory further stores instructions which, when executed by the one or more processors, cause the apparatus to acquire a plurality of images by changing the parameters of the images after image capturing.

11. An image recognition method, comprising:
acquiring an image;
generating a plurality of variation images by changing a parameter of the acquired image into each of different parameters;
extracting features from each of the plurality of variation images;
performing recognition on each of the plurality of variation images based on the extracted features; and
integrating recognition results of the plurality of variation images into an integrated recognition result, wherein the recognition results of the plurality of variation images are integrated by using a classifier that has been trained to decrease a difference between an output of the classifier and a supervisory value of learning data.

12. A computer readable storage medium storing a program which causes a computer to execute a method of image recognition, the method comprising;
acquiring an image;
generating a plurality of variation images by changing a parameter of the acquired image into each of different parameters;
extracting features from each of the plurality of variation images;
performing recognition on each of the plurality of variation images based on the extracted features; and
integrating recognition results of the plurality of variation images into an integrated recognition result, wherein the recognition results of the plurality of variation images are integrated by using a classifier that has been trained to decrease a difference between an output of the classifier and a supervisory value of learning data.

* * * * *